(12) United States Patent
Gold (10) Patent No.: US 6,828,919 B1
(45) Date of Patent: Dec. 7, 2004

(54) EXCITER ASSEMBLY TELEMETRY (75) Inventor: Calman Gold, Londonderry, NH (US)

(73) Assignee: American Superconductor Corporation, Westborough, MA (US)

( * ) Notice: Subject to any disclaimer, the term of this patent is extended or adjusted under 35 U.S.C. 154(b) by 388 days.

(21) Appl. No.: 09/713,349

(22) Filed: Nov. 13, 2000

Related U.S. Application Data (63) Continuation-in-part of application No. 09/480,430, filed on Jan. 11, 2000, now Pat. No. 6,420,842.

(51) Int. Cl.$^7$ .............................................. G08C 17/00
(52) U.S. Cl. .................. 340/870.29; 318/718
(58) Field of Search ................... 340/870.28, 870.29; 318/718, 712, 715; 310/68 D; 361/19; 335/216; 324/127

(56) References Cited

U.S. PATENT DOCUMENTS

| | | |
|---|---|---|
| 3,835,369 A | 9/1974 | Zoleta |
| 3,904,901 A | 9/1975 | Renard et al. |
| 4,045,716 A | 8/1977 | Bartram et al. |
| 4,175,230 A | 11/1979 | Richards et al. |
| 4,336,561 A | 6/1982 | Murphy |
| 4,442,396 A | 4/1984 | Hucker |
| 4,659,973 A | 4/1987 | Stich |
| 4,725,941 A | 2/1988 | Watanabe |
| 4,866,373 A | 9/1989 | Harada et al. |
| 5,181,170 A | 1/1993 | Huang et al. |
| 5,194,803 A | 3/1993 | Visser et al. |
| 5,241,447 A | 8/1993 | Barber et al. |
| 5,248,941 A | 9/1993 | Lee et al. |
| 5,414,586 A | 5/1995 | Hara et al. |
| 5,532,638 A * | 7/1996 | Kubo et al. ................. 327/368 |
| 5,625,548 A | 4/1997 | Gold et al. |
| 5,642,249 A | 6/1997 | Kuznetsov |
| 5,656,870 A | 8/1997 | Turnbull |
| 5,682,304 A | 10/1997 | Shteynberg |
| 5,726,873 A | 3/1998 | Gold et al. |
| 5,828,146 A | 10/1998 | Lorenz et al. |
| 5,942,997 A | 8/1999 | Silver et al. |
| 5,953,224 A | 9/1999 | Gold et al. |
| 5,965,959 A | 10/1999 | Gamble et al. |
| 6,066,948 A | 5/2000 | Seppa |
| 6,143,129 A | 11/2000 | Savas et al. |
| 6,157,094 A | 12/2000 | Gamble et al. |
| 6,420,842 B1 | 7/2002 | Gold |

FOREIGN PATENT DOCUMENTS

| | | |
|---|---|---|
| DE | 1955697 | 5/1971 |
| DE | 1 955 697 | 5/1971 |
| DE | 4034578 | 5/1992 |
| DE | 40 34 578 A1 | 5/1992 |
| DE | 19507760 | 9/1996 |
| DE | 195 07 760 A1 | 9/1996 |
| EP | 0 852 368 A1 | 7/1998 |
| EP | 0852368 A1 | 7/1998 |
| FR | 2 566 572 | 12/1985 |
| FR | 2566572 | 12/1985 |
| JP | 57-75564 | 5/1982 |
| JP | 63-310366 | 12/1988 |
| JP | 2-32784 | 2/1990 |
| JP | 4-145899 | 5/1992 |

OTHER PUBLICATIONS

International Search Report.

* cited by examiner

Primary Examiner—Timothy Edwards
Assistant Examiner—Hung Dang
(74) Attorney, Agent, or Firm—Fish & Richardson P.C.

(57) ABSTRACT

An exciter assembly supplies current to a superconducting load. The exciter assembly includes a transformer for generating the current and an optical emitter and an optical receiver. The transformer includes a stationary winding portion having a stationary winding and a rotatable winding portion having a rotatable winding that outputs the current for the superconducting load. The optical emitter and the optical receiver define an optical path over which information is exchanged between the stationary winding portion and the rotatable winding portion.

27 Claims, 9 Drawing Sheets

EXCITER ASSEMBLY TELEMETRY

RELATED APPLICATION

This application is a continuation-in-part of U.S. application Ser. No. 09/480,430, filed Jan. 11, 2000, now U.S. Pat. No. 6,420,842.

INCORPORATION BY REFERENCE

The following applications are hereby incorporated by referenced into the subject application as if set forth herein in full: (1) U.S. application Ser. No. 09/632,599, filed Aug. 4, 2000, entitled "Superconducting Synchronous Machine Field Winding Protection"; (2) U.S. application Ser. No. 09/481,484, filed Jan. 11, 2000, entitled "HTS Superconducting Rotating Machine"; (3) U.S. application Ser. No. 09/632,601, filed Aug. 4, 2000, entitled "Stator Coil Assembly For Superconducting Rotating Machines"; (4) U.S. application Ser. No. 09/632,602, filed Aug. 4, 2000, entitled "Segmented Rotor Assembly For Superconducting Rotating Machines"; and (5) U.S. application Ser. No. 09/632,600, filed Aug. 4, 2000, entitled "Exciter For Superconducting Rotating Machinery".

TECHNICAL FIELD

This invention relates to a system for controlling the flow of current to windings used in rotating machinery, and more particularly to controlling the flow of current to superconducting windings. The application also relates to telemetry electronics for exchanging information with, and about, the system.

BACKGROUND

Superconducting windings are being used in electrical machinery and rotating machines because of their low loss characteristics. While the superconducting windings are maintained at cryogenic temperatures, the power supplies used to drive the superconducting windings are typically maintained at ambient temperatures (300° K.).

In the design of electrical machinery, incorporating high temperature superconducting (HTS) windings (i.e., motors, generators, magnets), the heat leak associated with the leads carrying current from the power supply at ambient temperatures to the cryogenically cooled windings is an overriding design factor which dictates the cost and thermal capacity of closed-cycle cryogenic cooling apparatus. These losses increase as the temperature difference between ambient and coil temperature increases. A number of approaches have been suggested to minimize the impact of heat leaks in such systems especially those in which the leads carry currents approaching 1 KA. Unfortunately, where vapor cooling of leads is not an option, these approaches introduce high voltages into the system or do not eliminate the need for a high current lead pair entering the cryogenic environment with attendant heat leaks. In cases where the superconducting coil is rotating with respect to a warm stator coil, the problem of heat leaks into the cryogenic environment becomes more critical due to the design constraints imposed by the thermal path impedance of a stationary cryocooler coupled indirectly to a rotating heat load or constraints on the size, weight, and thermal capacity of a rotating cryocooler.

There exist a number of large scale commercial and defense applications of HTS coils (e.g., magnet systems, generators and synchronous motor field windings) which require relatively constant magnetic fields, and in which ample time is available to ramp the coil current up to its initial desired value prior to regulated operation. In electrical machine systems incorporating HTS windings, the current in the HTS coil is subject to flux creep due to the finite losses in the HTS conductor. The dissipation due to this finite, albeit small, resistive loss requires that the current be restored periodically, i.e., "pumped" via regulating circuitry back to its desired level. The energy input requirement is only that required to make up for the flux creep. Electronic circuits and mechanisms, which perform these functions, are referred to as "flux pumps".

SUMMARY

The invention features an exciter assembly and approach for supplying power to a superconducting load, such as a superconducting field coil, disposed within a cryogenic region of a rotating machine. The exciter assembly provides an efficient and reliable approach for transferring the electrical power energy across a rotating interface and for controlling the ramp up and regulation of field excitation current in the field coil. In particular, the invention provides telemetry circuitry that allows local and remote devices to communicate with the exciter assembly and vice versa.

In general, in one aspect, the invention features an exciter assembly that supplies current to a superconducting load. The exciter assembly includes a transformer for generating the current and an optical emitter and an optical receiver. The transformer includes a stationary winding portion having a stationary winding and a rotatable winding portion having a rotatable winding that outputs the current for the superconducting load. The optical emitter and the optical receiver define an optical path over which information is exchanged between the stationary winding portion and the rotatable winding portion. Using optical communications is advantageous because it reduces interference from external sources relative to other communication methods.

This aspect may include one or more of the following features. The stationary winding portion and the rotatable winding portion may be concentric rings or facing surfaces. The assembly may include a controller and circuitry for controlling the current supplied from the transformer to the superconducting load. This circuitry may be coupled to the rotatable winding portion. The circuitry exchanges information with the controller over the optical path. The controller includes an interface to an external device, over which the controller provides information to, and receives information from, the external device. The external device may be a device on a network. At least some of the information transmitted between the controller and the external device and between the controller and the circuitry may be the same information.

The optical emitter may be on the stationary winding portion and the optical receiver may be on the rotatable winding portion. The optical emitter and the optical receiver provide first information from the controller to the circuitry. The exciter assembly also includes a second optical emitter on the rotatable winding portion and a second optical receiver on the stationary winding portion. The second optical emitter and the second optical receiver provide second information from the circuitry to the controller. The first information includes at least one of a command to maintain a level of the current in the superconducting load and a command to release energy from the superconducting load. The second information includes diagnostic information that relates to one or more of the circuitry and the superconducting load.

The optical emitter and the optical receiver emit and receive, respectively, one of infrared light and visible light. The assembly also may also include a power source which supplies initial current to the stationary winding. The transformer generates the current in the rotatable winding from the initial current.

In general, in another aspect, the invention features an exciter assembly for supplying current to a superconducting load. The assembly includes a transformer for generating the current. The transformer includes a stationary winding portion having a stationary winding and a rotatable winding portion having a rotatable winding. A first optical emitter is mounted on the stationary winding portion and a first optical receiver is mounted on the rotatable winding portion. The first optical receiver receives information via light having a first wavelength from the first optical emitter. A second optical emitter is mounted on the rotatable winding portion and a second optical receiver is mounted on the stationary winding portion. The second optical receiver receives information via light having a second wavelength from the second optical emitter.

This aspect may include one or more of the following features. The first and second wavelengths of light may be different. For example, the first wavelength of light may be an infrared wavelength and the second wavelength of light may be a visible wavelength. The first wavelength of light may be a visible wavelength and the second wavelength of light may be an infrared wavelength. The first and second wavelengths of light may be part of the same region of the electromagnetic spectrum. For example, the first and second wavelengths of light may both be infrared wavelengths. The first and second wavelengths of light may both be visible wavelengths. Carrier frequencies of the light having the first and second wavelengths may be between 30 kHz and 1 MHz.

The stationary winding portion and the rotatable winding portion may be portions of concentric rings that cover greater than 180° and that overlap at least in part. The stationary winding portion and the rotatable winding portion may be facing surfaces. The stationary winding portion may include an air core to support the stationary winding and the rotatable winding portion may include an air core to support the rotatable winding.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference symbols in the various drawings indicate like elements.

DETAILED DESCRIPTION

Figure 1:
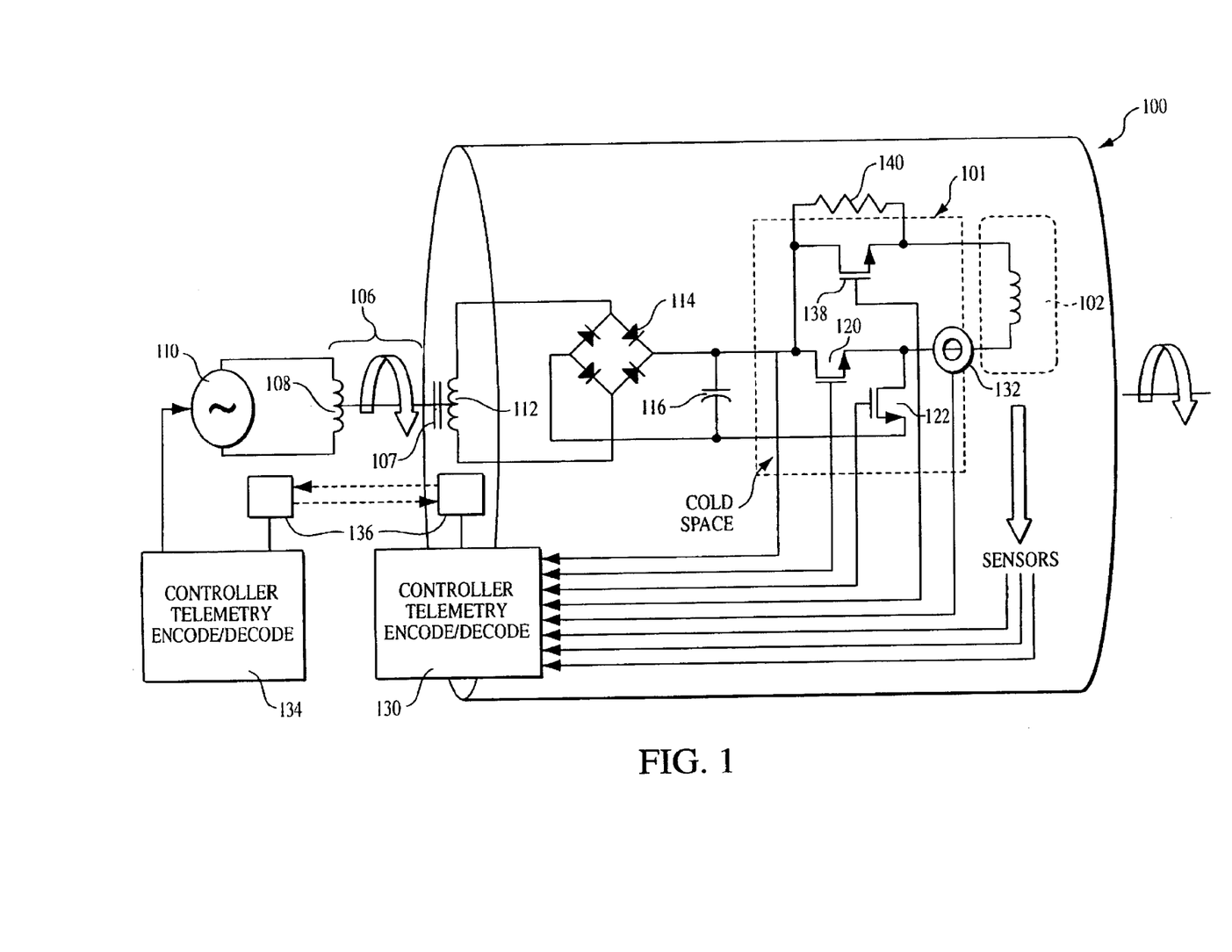
FIG. 1 is a schematic representation of a brushless exciter and regulating circuit.

Referring to FIG. 1, a brushless exciter assembly 100 includes a regulating circuit 101 for use with superconducting rotating machinery. In general, the brushless exciter assembly 100 provides the necessary electrical energy to one or more superconducting field windings, for example, windings of a rotor assembly. The superconducting field windings are represented here by an HTS field coil 102 and may be in any of a wide variety of configurations including layer-wound or pancake coils. Field coil 102 is maintained within a cryogenic chamber (e.g., cryostat) of the rotor assembly. The cryogenic chamber (not shown) maintains field coil 102 at temperatures conducive to superconduction (e.g., 20°–110° K.). One example, of a superconducting field winding having a configuration well suited for use in a rotating machine is described in U.S. application Ser. No. 09/415,626, entitled "Superconducting Rotating Machines", filed Oct. 12, 1999 and incorporated herein by reference. More particularly, the brushless exciter assembly provides the energy across a rotating reference interface to field coil 102 of the rotor assembly.

As shown in FIG. 1, brushless exciter assembly 100 includes a transformer 106 having a primary winding 108 for receiving current from an AC power source 110 and a secondary winding 112. AC power source 110 is preferably a high frequency excitation source (e.g., 400 Hz to 2 kHz) to permit reduction of the core cross-section and mass of transformer 106. In one embodiment, transformer 106 includes a core 107 constructed of segmented sections of distributed air-gap pressed powder core material, such as powdered iron U-cores. In this case, the core segments are separated by air gaps and the core segments are disposed in a radial direction and lie in an angular relationship with respect to one another to form a "circular disk" of the transformer core. Brushless exciter assembly 100 also includes a full-wave bridge rectifier 114 connected to secondary winding 112 for rectifying the AC current and providing the DC current required by field coil 102 and a storage capacitor 116. In essence, brushless exciter assembly 100 serves as a "flux pump" for transferring power across the cryogenic barrier in the absence of conductive leads or joints.

Figure 2:
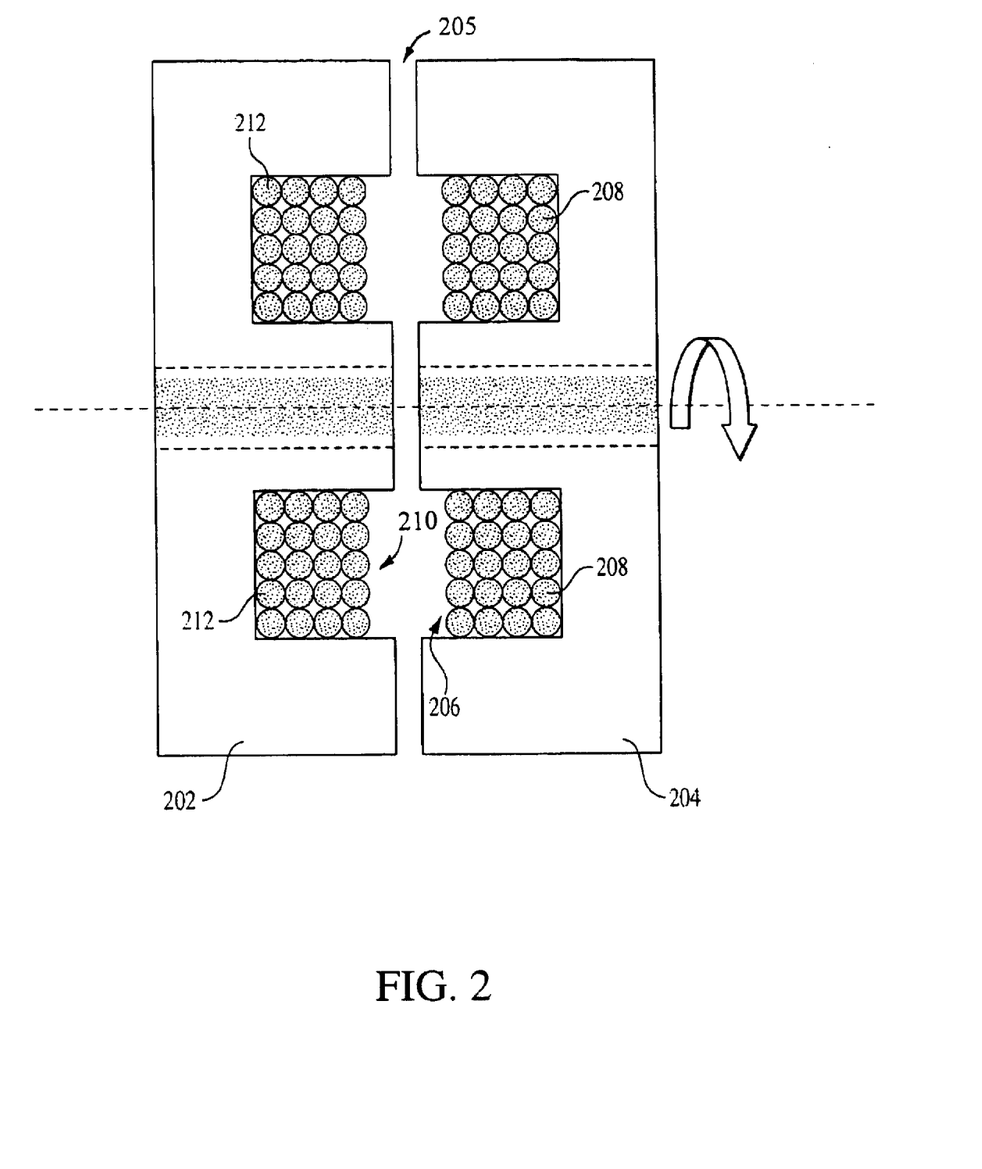
FIG. 2 is a diagrammatic representation of a transformer of the brushless exciter assembly of FIG. 1.

Referring to FIG. 2, primary winding 212 and secondary winding 208, which are structural equivalents of primary winding 108 and secondary winding 112 in FIG. 1, include a stationary core 202 and a rotating core 204, respectively. Stationary core 202 is spaced from rotating core 204 by an air gap 205 (e.g., 1–4 mm) and may be mounted, for example, to the stationary (stator) assembly of the rotating machine. Rotating core 204 is formed of a high permeability material (e.g., iron) and includes a groove 206 within which a coil winding 208 is disposed. Stationary core 202 is similarly formed of a high permeability material and includes a groove 210 within which a coil winding 212 is disposed. To reduce eddy currents, rotating core 204 and stationary core 202 are formed as laminations separated by varnish or oxide.

Cores 202, 204 are positioned such that winding 208 is positioned directly across from winding 212. Each of the coil windings is wound from a continuous insulated copper wire. Thus, the disk arrangement provides transformer 106 having secondary winding 112 rotating relative to primary winding 108 of the transformer (or vice versa). One feature of this particular arrangement is that the flux linkage generated by stationary core 202 and rotating core 204, when stationary, is the same as when the rotating core rotates. In other words, transformer 106 has a design having a rotation invariant coupling between the primary winding and the secondary winding. That is, the induced voltage is independent of rotational speed and instantaneous position of primary windings relative to secondary windings. This feature advantageously allows field coil 102 to be charged prior to rotating core 204 rotating (i.e., before rotating machine operates).

Referring again to FIG. 1, regulating circuit 101 includes a pair of MOSFET switching devices 120, 122 arranged in a half bridge arrangement similar to a synchronous step-down ("buck") DC-DC converter topology. In this embodiment, however, the conventional LC output filter has been replaced with field coil 102 with the converter used to regulate the average field excitation current.

As in any superconducting magnet coil, the HTS field coil must be monitored for incipient quench and a provision must be made to dump the energy stored in the coil in sufficient time to prevent catastrophic failure. Thus, to address this concern, the persistence of an additional switching device 138 is included in series with the coil. Thus, switch 138 is normally closed and shunts-out a dump resistor 140 used to dissipate energy from field coil 102 in the event of a quench. That is, in normal operation, switching device 138 is normally conducting to allow current to bypass dump resistor 140, which is preferably positioned outside the cold space of the rotor assembly.

Further, in this embodiment, MOSFET devices 120, 122 are n-channel enhancement mode devices exhibiting low on-resistance and supporting the maximum reverse voltage in the voltage regulator without breakdown. Moreover, the MOSFET devices are cryogenically cooled to advantageously decrease their on-resistance, but at the expense of reducing their operating voltage ratings (e.g., as much as 20%). In certain embodiments, to further decrease the on-resistance of the MOSFET switching devices, several MOSFET devices are connected in parallel. Indeed, many MOSFET devices can be combined in a large parallel array.

Field current controller 130 contains a pair of gate driver circuits for controlling the respective gates of MOSFET devices 120, 122. The gate drivers are responsive to logical control signals, one logic signal being the inversion of the other. In embodiments in which MOSFET devices 120, 122 are cryogenically cooled, it is generally preferable to cryogenically cool field current controller 130 as well.

In operation, alternating current supplied from AC power source 110 induces a changing magnetic field in primary winding 108 which, in turn, induces alternating current flow in secondary winding 112. Rectifier 114 converts the alternating current induced in secondary winding 112 into direct current. The direct current is selectively transferred to field coil 102 by MOSFET devices 120, 122. In particular, MOSFET devices are controlled by controller 130 to alternately (1) provide charging current to field coil 102 ("ramping" mode) and (2) recirculating current in the field coil ("persistence" mode).

In ramping mode, MOSFET device 122 is closed, while MOSFET device 120 is open. As a result, DC current from rectifier 114 (and capacitor 116) is applied to field coil 102, thereby ramping up the current flow. In ramping mode, the DC current is supplied until the desired current levels within field coil 102 are achieved, at which time the respective states of MOSFET devices 120, 122 are changed to place voltage regulator into persistence mode.

In persistence mode, MOSFET device 122 is open, while MOSFET device 120 is closed to shunt current flowing through field coil 102. At cryogenic temperatures, field coil 102 is superconducting and has a relatively low loss. Thus, aside from the low loss of the field coil, a substantial portion of loss in the persistence mode is attributable to MOSFET device 120. MOSFET device 120 is designed for minimum voltage drop since it carries current for a majority of the time (the field coil 102 presumably reasonably persistent). Further details of the operation of a switching circuit operated in accordance with alternating ramp up and persistence modes is described in U.S. Pat. No. 5,965,959, assigned to the assignee of the present invention, and incorporated herein by reference.

MOSFET switching devices 120, 122 are not active simultaneously. Indeed, simultaneous control is prevented by switching controller 130 and, in accordance with standard practice, a short time interval or "deadtime" is permitted to elapse between the activation of MOSFET devices 120, 122. Furthermore, because operation of MOSFET switching devices 120, 122 is mutually exclusive, in certain embodiments, only one logic signal is required to operate switching control. That is, the gate drive signals provided by switch controller 130 are essentially complementary logic signals.

As discussed above, direct current from rectifier 114 (and capacitor 116) is applied to field coil 102, to ramp up to a final excitation current level in field coil 102 in a relatively short time (e.g., several seconds). At this point, MOSFET switches 120, 122 are switched to place the regulator in persistence mode. Once in the persistence mode, the input current flowing through primary winding 108 drops essentially to zero. Switch controller 130 uses a sensing circuit 132 to monitor the current level at field coil 102. Due to the low loss characteristic of the field coil, the field excitation current decays slowly. However, when sensing circuit 130 detects a drop below a predetermined threshold value (e.g., 1% of the final excitation current), MOSFET switch 122 is activated for a very short period (e.g., <10 msecs) to pump the current in field coil 102 back up to the desired final excitation current level. In particular, capacitor 16 discharges for that short period (generally less than ¼ of a sine wave) to pump up field coil 102, at which point MOSFET devices 120, 122 are switched to place regulator back into persistence mode. The field current is periodically restored by controlling the duration of operation the pump switch. It will be appreciated that the transfer of energy from the capacitor to the field coil is a resonant discharge of the capacitor. The capacitor cannot be allowed to discharge beyond zero volts or the coil will recharge it in the opposite polarity due to the resonant behavior. Thus, the maximum duration of the restorative operation is one-quarter of the resonant period of the capacitor with the coil inductance. This would also correspond to the maximum increment of current increase in the inductor at the end of the restorative cycle. The controller is programmed to adjust or regulate the incremental change in coil current per pump cycle to be less than the maximum increment available by adjusting the duration of switch operation.

In essence, capacitor 116 serves to provide a "trickle" charge to field coil 102 at relatively infrequent times and for a relatively short duration. For example, field coil 102 may only require tens of milliseconds to pump up with several seconds passing between periods of recirculation. An important advantage of controlling regulating circuit 101 in this way relates to transformer 112. Specifically, because current flows through secondary winding 108 for only very short periods of time, a transformer having a secondary winding with a much lower rating can be used. Indeed, the size and rating of the secondary winding can be selected such that it is allowed to operate above its normal rating for the short period of time needed to charge field coil 102 to its desired value during the initial ramp up period.

A data logging and master motor controller 134 is provided to receive and store data from field current controller 130. Bi-directional communication between field current controller 130 on the rotating side and the data logging and master motor controller 134 on the stationary side of the motor is required. Setpoint commands for controlling the field current must be issued and acted upon by the control electronics and rotating power electronics. While the rotating control is autonomous for any setpoint currently issued, the rotating control must acquire and monitor coil voltage and current for both current regulation and coil protection. Controller 134 receives telemetry indicating status on the rotating side. This status may include temperatures and other data indicating the condition of the field coil. Field coil controller 130 includes a microcontroller with A/D (Analog-to-Digital) conversion and digital I/O (Input/Output) to locally control the switching devices for regulation of coil current, sense coil conditions, and telemetry data and status to the stationary side.

The bi-directional communication uses pulse code modulated carrier infrared (IR) optical data transmission and reception. The interface protocol for communicating with controller 134 may thus be standard RS-232 or RS-485, thus permitting any serial port equipped computer to communicate with the motor. In one embodiment, a 56.8 kHz carrier modulated at 1200 baud serial data rate is used. An optical emitter and receiver are closely coupled, and the received signal is made rotation invariant, as was the case above with the primary and secondary windings of transformer 106. Rotation invariance is achieved through the use of several synchronously driven 940 nm IR emitters 136 to form an area (ring) light source. The rotating side microcontroller converts acquired signals and transmits digitally encoded data strings to the stationary side on a regularly determined time schedule. Commands from the stationary side are sent to the rotating side as required to change the setpoint for the field current. The communication is half-duplex, thus one wavelength can be used for both transmission and reception across the rotating boundary. It is appreciated that somewhat higher or lower modulation frequencies are useable and that other IR wavelengths are also acceptable.

Figure 3:
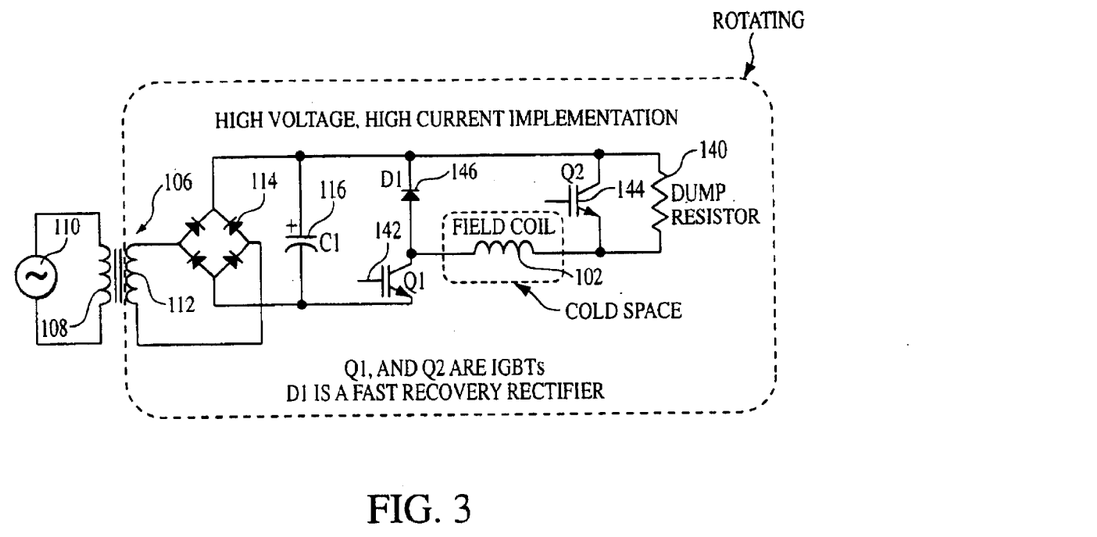
FIG. 3 is a schematic representation of an alternative embodiment of a brushless exciter assembly.

Referring to FIG. 3, in an alternative embodiment, the regulating circuit is removed from the cold space leaving only the field coil within the cryogenic environment. Positioning the electronics outside the cold space allows the use of higher voltage semiconductor devices including IGBTs (Insulated Gate Bipolar Transistor) for the first and second switching devices. For example, as shown in FIG. 3, high power IGBT devices 142, 144 are substituted for the MOSFET devices 120, 138 of the cold embodiment of FIG. 1, respectively. A fast recovery rectifier diode 146 is substituted for MOSFET device 122. One advantage of this embodiment is that complexity of the assembly and associated drive electronics is reduced because large power blocks can be used instead of array of MOSFETs. Although more power is dissipated in the higher voltage, non-cryogenically cooled IGBT devices, the power is dissipated outside of the cryogenic environment and sufficient mass and is available to cool the devices without complex thermal management. Moreover, in the event of failure of the switching devices or associated electronics, repair and maintenance is facilitated since there is no need to open the cryostat to gain access to the switching devices.

In general, the semiconductor switching devices described above have a voltage rating commensurate with the operational voltages of the system. However, it is appreciated that overvoltage protection, such as snubber or clamping circuitry, can be incorporated in accordance with well-accepted, standard practices to address transient levels of voltages that may exceed the switching devices rating. Such transients are particularly problematic during the startup in an induction mode of a synchronous motor.

Figure 4:
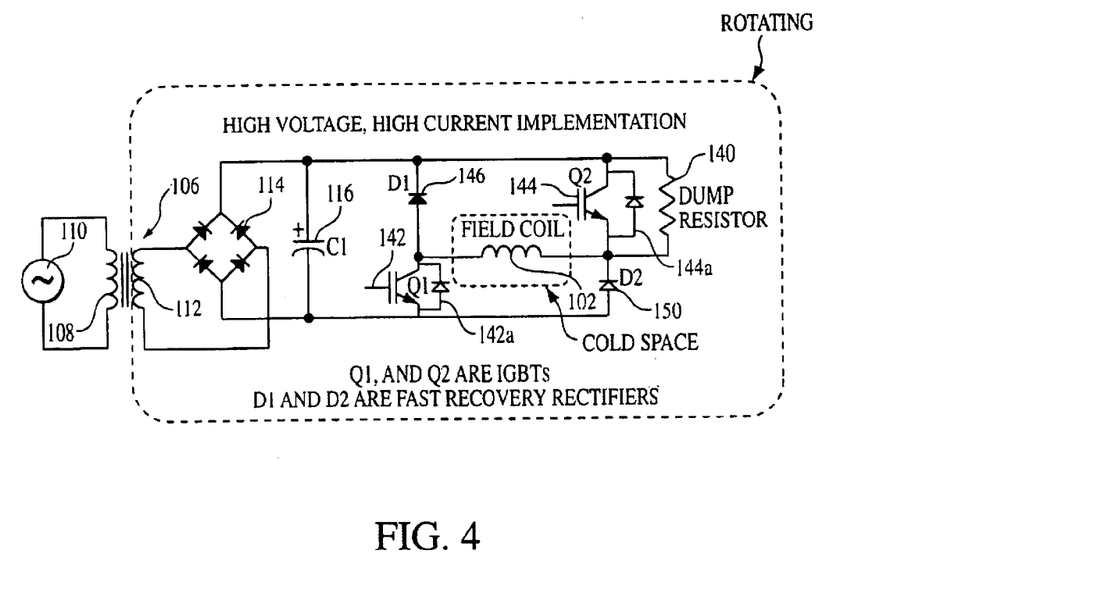
FIG. 4 is a schematic representation of another alternative embodiment of a brushless exciter assembly.

Referring to FIG. 4, an alternative embodiment of a regulating circuit having an additional fast recovery diode 150 is shown. Diode 150 generally has a voltage rating identical to that of diode 146. In essence, the addition of diode 150 forms a full-bridge rectifier arrangement which, as will be described below, provides additional advantages. IGBT devices 142 and 144 are also shown to have diodes 142a, 144a, which are typically co-packaged with the IGBT devices. In the MOSFET arrangement of FIG. 1, such diodes are generally in the form of intrinsic drain-to-source diodes.

In operation, when the end of field coil 102 connected to IGBT device 142 is positive relative to the end of the field coil connected to IGBT device 144, the co-packaged diodes 142a, 144a conduct through field coil 102 and charge up capacitor 116 during a first half cycle. When the polarity of field coil 102 is reversed in the opposite half cycle, diodes 146 and 150 conduct. Thus, as AC current is induced in field coil 102, unipolar DC is produced in capacitor 116 as if secondary winding 112 of transformer 106 was being bridge rectified into capacitor 116. In essence, field coil 102 acts as a source for charging capacitor 116 instead of transformer 106.

This approach is particularly attractive in applications wherein a synchronous superconducting motor is started as an induction motor and then once the shaft speed of the motor reaches a certain threshold level (e.g., measured by a tachometer), the motor is switched into a synchronous mode and ramp up of the field coil is started. Thus, energy can be provided to capacitor 116 (in essence, "precharged") without energy being provided from secondary winding 112. In certain applications, a substantial amount of energy can be stored in capacitor 116 prior to activating source 110.

Figure 5:
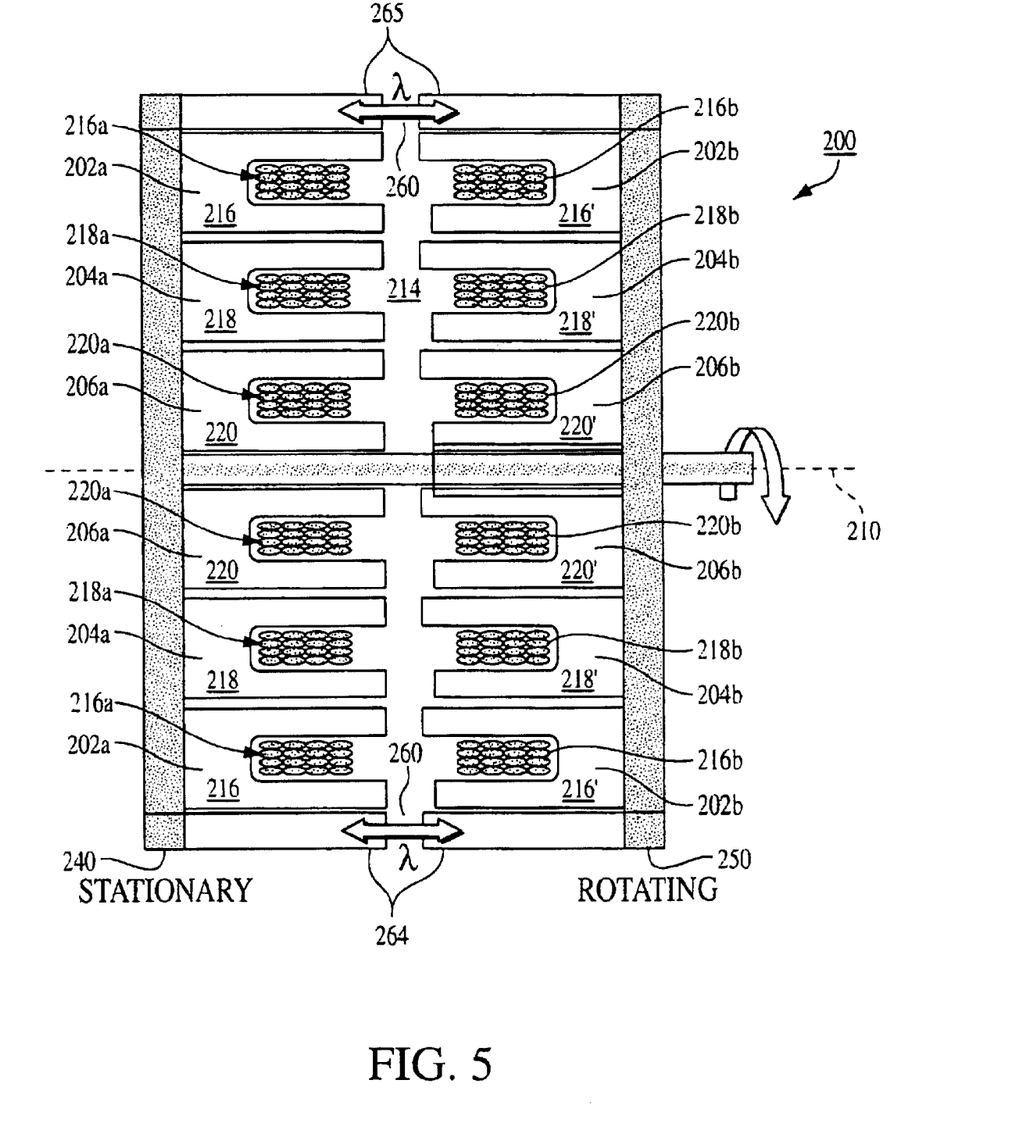
FIG. 5 is a diagrammatic representation of a polyphase transformer used in a polyphase embodiment of the exciter.

Referring to FIG. 5, a three-phase exciter transformer 200 is shown to include three primary structures 202a, 204a, 206a and corresponding secondary structures 202b, 204b, 202b. Primary structures 202a, 204a and 206a are concentrically disposed around a longitudinal axis 210 of the transformer and are radially spaced from each other. Secondary structures 202b, 204b and 206b are similarly positioned around axis 210 and are axially spaced from corresponding primary windings by a gap 214 (e.g., 1–4 mm). Each primary structure includes U-shaped core members 216, 218, 220 formed of a relatively high permeability material for supporting primary windings 216a, 218a, 220a. In this and other embodiments, non-magnetic material, such as G10 epoxy glass (i.e., an air core), can be used in place of the high permeability material to support the primary and/or secondary windings. The primary windings are positioned in opposing relationship with secondary windings 216b, 218b and 220b supported in U-shaped core members 216', 218', and 220'. The U-shaped core members of the primary structures and secondary structures serve to provide isolation between adjacent windings. Each of primary structures 202a, 204a and 206a are driven by a corresponding phase of a three-phase AC source. Secondary structures 202b, 204b, and 206b are connected to a conventional solid-state polyphase rectifier.

Figure 6:
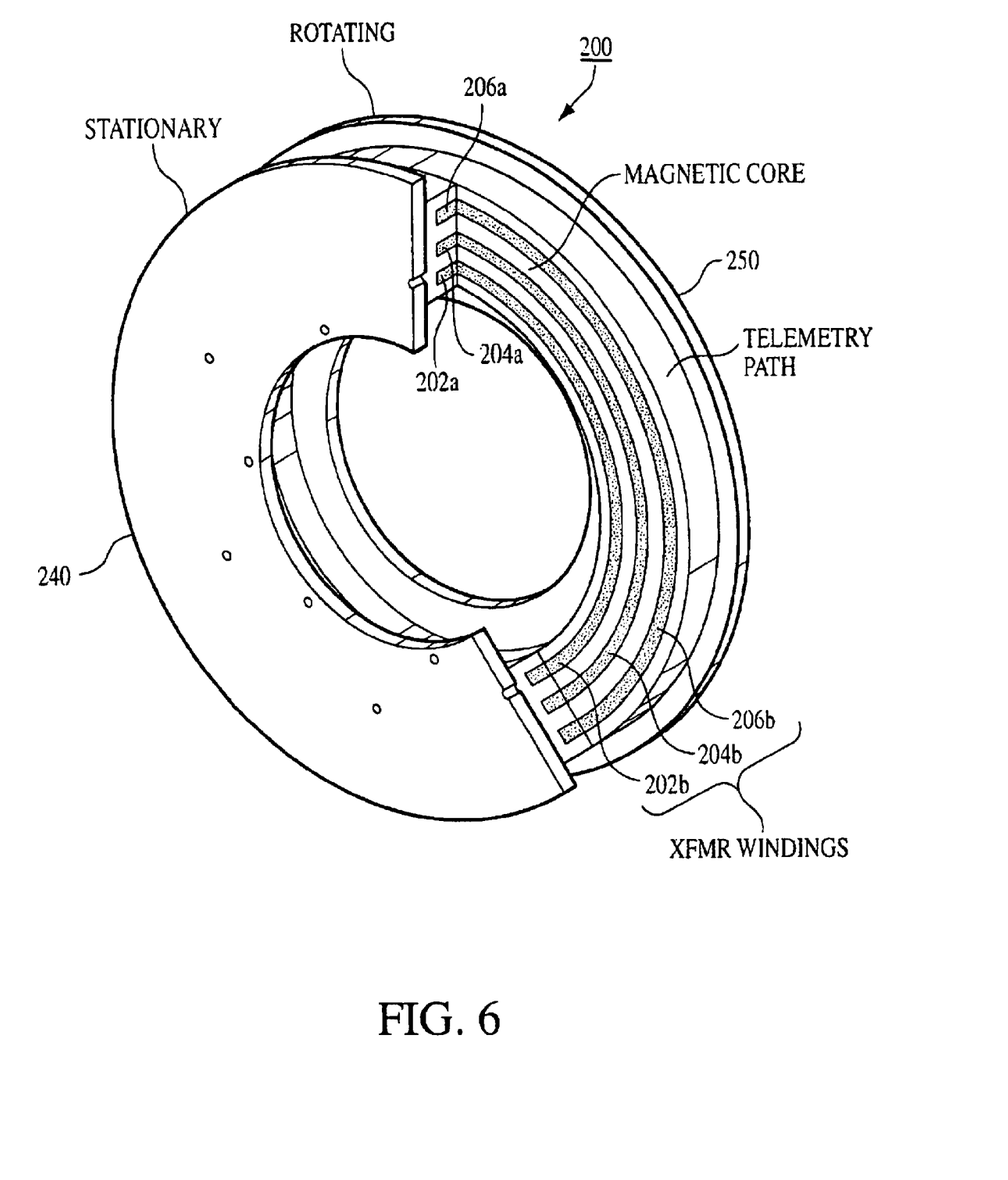
FIG. 6 is a perspective view of the polyphase transformer if FIG. 5.

FIG. 6 shows a perspective view of the geometry of exciter transformer 200. As shown in FIG. 6, primary structures 202a, 204a, 206a are arranged on a stationary portion 240 of transformer 200 and corresponding secondary structures 202b, 204b, 2026b are arranged on a rotatable portion 250 of transformer 200. Rotatable portion 250 rotates about axis 210 relative to stationary portion 240. In this embodiment, stationary portion 240 and rotatable portion 250 are facing surfaces with exposed primary windings 216a, 218a, 220a and exposed secondary windings 216b, 218b, 220b, respectively.

FIG. 5 depicts the optical path 260 defined by stationary portion 240 and rotatable portion 250. It is via this optical path that optical emitters and receivers, which are arranged on stationary portion 240 and rotatable portion 250, exchange information. In this embodiment, optical emitters are arranged on both stationary portion 240 and rotatable portion 250. Corresponding optical receivers are also arranged on stationary portion 240 and rotatable portion 250 to receive information from the optical emitters. The optical path is location-invariant with respect to each optical emitter/receiver pair. This is achieved by coating all surfaces except the communication edges of stationary portion 240 and rotatable portion 250 with a reflective material, such as a metallized mirror, metallized Mylar, aluminum tape, or a white substance, to create a light guide having a restricted aperture. Any type of reflective material may be used, so long as the material reflects the wavelengths used for communication.

For the sake of illustration, optical emitter/receiver pair 264 and optical emitter/receiver pair 265 are shown in FIG. 5; although it is noted that there may be more than two optical emitter/receiver pairs on both stationary portion 240 and rotatable portion 250. The optical emitters and receivers can be located anywhere on the primary winding and secondary winding portions; they are not limited to opposite one another as shown in FIG. 5. The optical emitter/receiver pairs may be configured to permit either half-duplex or full-duplex communication between circuitry (described below) on stationary portion 240 and rotatable portion 250 of transformer 200. As background, half-duplex communication is communication in only one direction (e.g., from stationary portion 240 to rotatable portion 250) at a time. Full duplex communication is concurrent bidirectional communication.

To implement half-duplex communication, optical emitter/receiver pairs 264 and 265 may communicate using the same wavelength, such as 940 nm wavelength IR, as described above. Alternatively, visible light, such as 660 nm wavelength light, may be used, or any other suitable wavelength on the electromagnetic spectrum.

To implement full-duplex communication, different wavelengths of light are used to communicate in the two directions, i.e., from stationary portion 240 to rotatable portion 250 and from rotatable portion 250 to stationary portion 240. These two wavelengths may be from the same region of the electromagnetic spectrum, such as two types of IR or visible light, or from different regions of the electromagnetic spectrum. For example, 660 nm visible light may be used to transmit data in one direction and 820 nm IR or 940 nm IR may be used to transmit data in the other direction.

The bi-directional communication link between stationary portion 240 and rotatable portion 250 is implemented, in this embodiment, using a pulse-code-modulated serial data protocol with data conveyed and detected at specific carrier frequencies. Detection of IR and/or visible light is implemented by solid state optical receivers which provide optical bandpass filtering as well as frequency selective demodulation of carrier data bursts. In this embodiment, the carrier frequency is 56.8 kHz, providing an effective baud rate of approximately 1200 baud. Higher carrier frequencies may be used to provide higher data transfer rates. For example, carrier frequencies up to 1 MHz may be used. The 1200 baud transfer rate provides 16 channels of data in a period of roughly 21 ms (milliseconds). This permits fast scan instrumentation channels (e.g., coil voltages, coil current, and status) to be conveyed at an effective rate of 5 Hz, and slow sub-multiplexed channels (e.g., temperatures) to be conveyed at 0.625 Hz. Commands can be sent in a period of 1.8 ms. It is noted that the number of channels can be different and the data rates can also be different in alternative embodiments of the invention.

Figure 7:
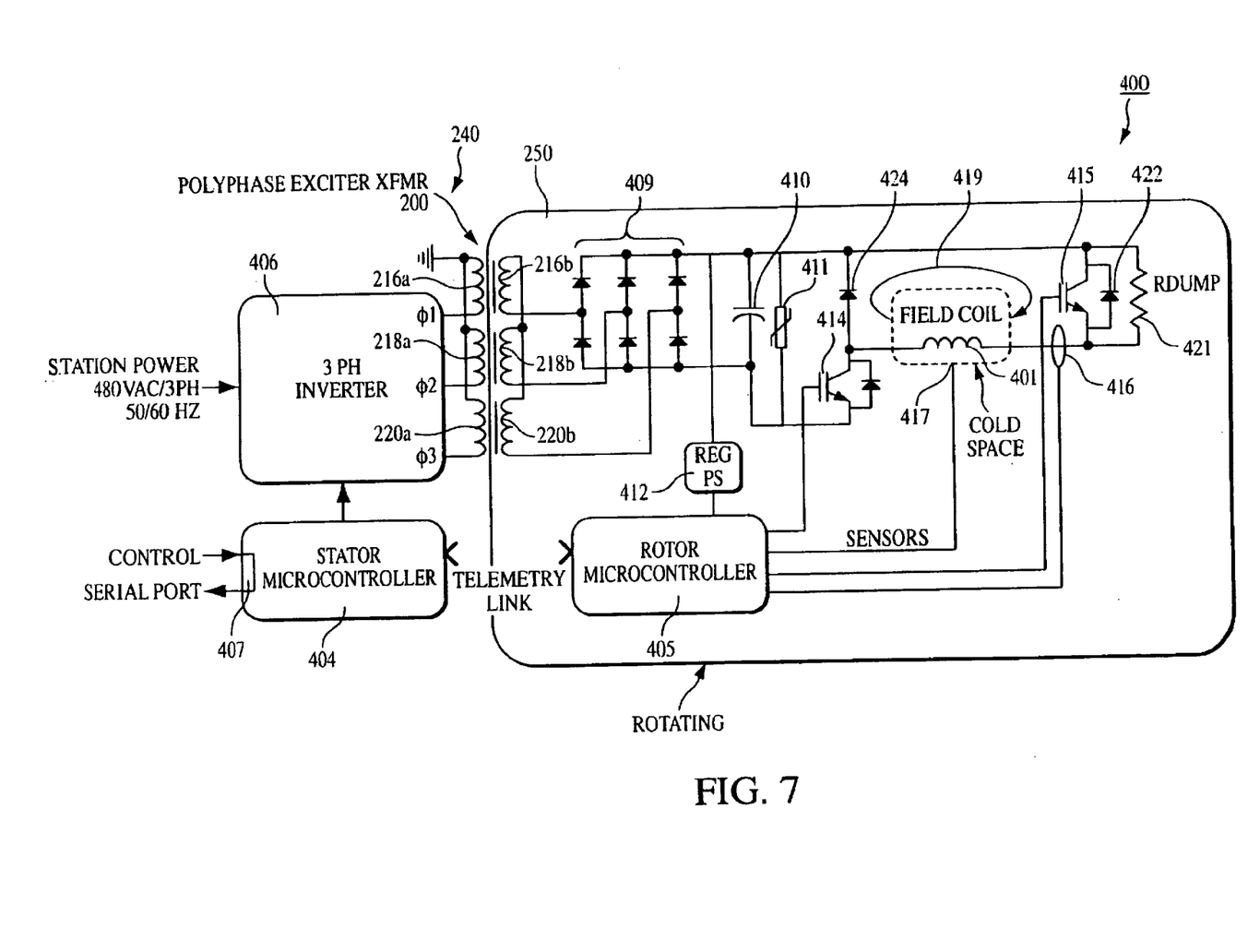
FIG. 7 is an alternative embodiment of an exciter assembly for use with the polyphase transformer.

Referring now to FIG. 7, a three-phase inverter system 400 is shown for charging a superconducting load 401 using exciter transformer 200. In system 400, two microcontrollers 404 and 405, one on stationary portion (stator) 240 and one on rotatable portion (rotor) 250, exchange information over the bi-directional communication link provided by optical emitter/receiver pairs 264 and 265. Typical commands from stator microcontroller 404 to rotor microcontroller 405 include commands to maintain a current level in superconducting load 401 and commands to release (or "dump") the energy in superconducting load 401, e.g., in response to a detected quench or the like. Commands from rotor microcontroller 405 to stator microcontroller 404 include telemetry data acquired by instrumentation that measures the state of superconducting load 401, such as temperatures, currents and voltages associated with superconducting load 401.

In more detail, the commands from stator microcontroller 404 to rotor microcontroller 405 are sent periodically, and include rotor setpoint commands and rotor state change commands. The rotor setpoint commands provide the desired current through the superconducting load as a binary fraction of full-scale current. State change commands request that a specific action be taken by rotor microcontroller 405. These commands can be used to initiate an energy dump of superconducting load 401, to initiate a reset of a switch that controls the dump, or to inhibit a current regulator pump switch. Circuitry to implement these functions is described below.

Commands from stator microcontroller 404 are received and acknowledged by rotor microcontroller 405 by transmitting state bits following execution of the commands to effect the desired state change. Rotor microcontroller 405 sends a data burst in response to each periodically-issued command from stator microcontroller 404. Telemetry data is included in this data burst. The telemetry data includes, among other data, groups of eight channel bursts which include a status word and a channel group and sub-channel ID (IDentifier) of sub-multiplexed temperature data. Thus, the data burst serves as both an acknowledgement and telemetry data.

In FIG. 7, the circuitry on stationary portion 240 includes stator microcontroller 404 and three-phase inverter 406, in addition to primary windings 216a, 218a, 220a. Three-phase inverter 406 provides three-phase power to primary windings 216a, 218a, 220a. Primary windings 216a, 218a, 220a commutate this energy to secondary windings 216b, 218b, 220b, which results in current flow through secondary windings 216b, 218b, 220b. As noted, stator microcontroller 404 exchanges commands and telemetry data with rotor microcontroller 405 via optical emitter/receiver pairs mounted on stationary portion 240 and rotatable portion 250 of transformer 200. Stator microcontroller 404 also receives status data from three-phase inverter 406. This status data may include information on the amount of power available from three-phase inverter 406 and can initiate a dump of energy from the superconducting load in response to this information.

Stator microcontroller 404 may be a microprocessor or the like and includes a serial interface 407 to one or more external devices (not shown). Through this interface 407, information is exchanged with an external device. The information may include commands provided by the external device for controlling system 400, e.g., to dump energy from the superconducting load. The information also may include information on the status of system 400. For example, interface 407 may be an interface to a network, such as the Internet. By accessing a secure Web page for system 400, a user is thus able to issue commands to system 400 and/or obtain status information about system 400.

The circuitry on rotatable portion 250 includes secondary windings 216b, 218b, 220b, diode bridge 409, capacitor 410, fuse 411, regulated power supply 412, rotor microcontroller 405, switches 414, 415, sensors 416, 417, and superconducting load 401. Rotor microcontroller 405 may be implemented in hardware, software, or a combination of the two. For example, it may be implemented using an appropriately-programmed microprocessor, an ASIC (Application-Specific Integrated Circuit), or programmable logic such as an FPGA (Field Programmable Gate Array).

In this embodiment, rotor microcontroller 405 is implemented using hardware circuitry, along with associated A/D (Analog-to Digital) converters and instrumentation amplifiers. These provide 30 channels of data to be acquired and conveyed to stationary portion 240 for diagnostic purposes and general data logging. These 30 channels are partitioned to provide 16 physical channels, of which two channels contain 8 sub-channels, each used for the aforementioned multiplexed temperature sensors. Thus, 14 channels of high-rate (5 Hz) data-and 16 channels of low rate (⅝ Hz) data are available. The high-rate channels transmit data relating to the current through loop 419, superconducting load voltages, DC charging voltages, power electronics heat-sink temperatures, and two spares. The low-rate data channels include 16 channels of multiplexed temperature sensors. These channels are excited by a precision reference current source and are designed to accommodate resistive temperature sensors, such as ruthenium oxide, due to their large signal output at temperatures from ambient temperature to 4° K. The large signal outputs render negligible the multiplexer switch resistance contribution to temperature error at higher ambient temperatures and permits temperature sensors to be multiplexed as two-wire, rather than four-wire, readings.

Instrumentation amplifiers may be used in rotor microcontroller 405 to accommodate coil voltages and current measurements in the presence of high common-mode voltages in superconducting load 401. In one embodiment, these amplifiers utilize a flying capacitor input structure to reject common mode signals and solely provide a differential signal as an amplified and filtered ground referenced signal to A/D converter inputs. The instrumentation amplifiers incorporate optically isolated semiconductor switches to perform rapid switching between acquisition and reading of the flying capacitor differential voltage.

The operation of circuitry on rotatable portion 250 is similar to the operation of corresponding circuitry shown in FIGS. 1, 3 and 4. That is, rotor microcontroller 405 conveys a setpoint reference to hardware current regulation circuitry (not shown) (e.g., in rotor microcontroller 405), which gates switches 414, 415 to control the supply of current to superconducing load 401. In this embodiment, superconducting load 401 is the superconducting coil of a superconducting magnet dispersed in a cryogenic material. When switch 414 is open and switch 415 is closed, current through loop 419 persists by virtue of the minimal resistance through superconducting load 401. When that current ramps down due, e.g., to resistance in the non-superconducting elements of loop 419, rotor microcontroller 405 closes switch 414 to provide DC current from energy stored in capacitor 410 to loop 419. Opening switch 415 introduces a dump resistor 421 ($R_{dump}$) into loop 419. When this switch is opened by rotor microcontroller 405, energy in the superconducting load is "dumped", i.e., the resistance in dump resistor 421 dissipates the energy from the superconducting load.

Diode bridge 409 rectifies current from secondary windings 216b, 218b, 220b to charge capacitor 410. The current is provided to superconducting load 401 through capacitor 410, rather than directly, in order to reduce current variations/ripples, which can affect the stability of the superconducting load resulting in a quench therein. Regulated power supply 412 provides low-voltage power to the components on rotatable portion 250 and sensors 416 and 417 measure temperatures, currents, voltages, etc., that relate to the superconducting load and provide this telemetry data to rotor microcontroller 405.

In this embodiment, on the stationary portion 240, three-phase inverter 406 derives its power by rectifying three-phase 480 VAC power provided by a central station (not shown) to a nominal 650 VDC link. Three-phase inverter 406 is a six-pulse, three-phase inverter that is implemented using a single thin-pack IGBT module, associated gate drive electronics, and pattern generation logic. The IGBT module provides an inverter that includes three half-bridges and that delivers a nominal 450 VAC (phase-phase) three-phase 1 kHz current to the primary transformer windings. The six-pulse design provides ease of implementation and its output spectrum does not contain triple harmonics (i.e., $3^{rd}$, $9^{th}$, etc.). Unlike a pulse-width-modulated inverter, the output frequency of inverter 406 may be changed simply by changing its logic drive oscillator frequency. Inverter 406 also includes a logic enable input line to permit control by stator microcontroller 404 as required for startup or inhibiting power transfer to secondary windings 216b, 218b, 220b.

The high frequency (1 kHz) AC (Alternating Current) is supplied by three-phase inverter 406 driving the Y-connected primary winding of exciter transformer 200. This power, coupled to the secondary windings, is rectified to a DC potential on capacitor 410 and is used to charge superconducting load 401 to a specified current by the operation of switches 414, 415 which, in this embodiment, are IGBT power semiconductor switches.

With an initial open circuit DC voltage potential of 400 V across capacitor 410, a 12.5 H (Henry) superconducting coil can be precharged to a full operating level of 150 A in about 5 seconds. Once charged, the superconducting coil current will slowly decay at a rate determined by the combined forward voltage drop of switch 415 and diodes 422,424. The forward drop in this path is typically 2.9 V. Thus, the decay rate of the current is 232 mA/s. Restoration of the current to its desired level is performed by the operation of switch 414 for a duration of roughly 5 ms every 1 second assuming a +/−0.1% regulation of current. The setpoint for the current through loop 419 is conveyed to rotor microcontroller 405 via the bi-directional communication link described above.

In the event of an incipient quench in superconducting load 401, an overcurrent condition, or in response to a command from stator microcontroller 404, the energy in superconducting load 401 is released into dump resistor 421. As noted, this is achieved by gating switch 415 accordingly. This causes superconducting load 401 to discharge rapidly. Short-term gating of switch 415 followed by persistence mode may be used to lower the current through loop 419 to a new setpoint.

Figure 8:
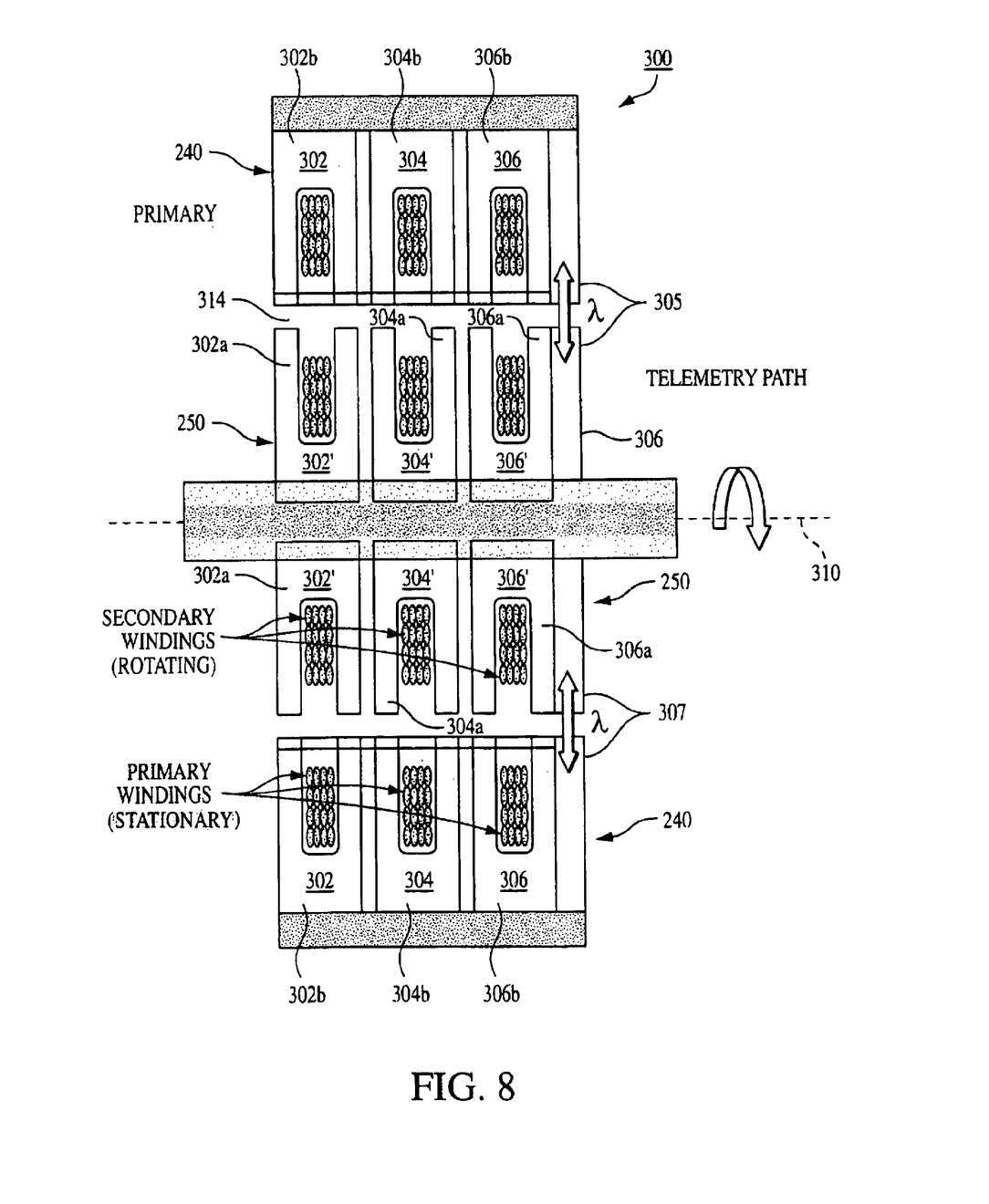
FIG. 8 is a diagrammatic representation of an alternative embodiment of a polyphase transformer.

In the alternative embodiment of FIG. 8, a three-phase transformer 300 is shown for use with system 400. Three-phase transformer 300 includes three secondary structures 302*a*, 304*a*, 306*a* surrounded by three concentrically mounted primary structures 302*b*, 304*b*, 306*b* along an axis 310. As was the case above, windings of the primary structures are supported by U-shaped core members 302, 304, 306 and windings of the secondary structures are supported within corresponding U-shaped core members 302', 304', and 306'. U-shaped core members 302, 304, 306 are spaced from corresponding U-shaped core members 302', 304', and 306' by a gap 314.

Also shown in FIG. 8 are optical emitter/receiver pairs 305 and 307, which implement bi-directional full-duplex or half-duplex communication paths. As above, to implement half-duplex communication, optical emitter/receiver pairs 305 and 307 may communicate using the same wavelength, such as 940 nm wavelength IR. To implement full-duplex communication, different wavelengths of light may be used to communicate in the two directions, i.e., from stationary portion 240 to rotatable portion 250 and from rotatable portion 250 to stationary portion 240. For example, 660 nm visible light may be used to transmit data in one direction and 880 nm or 940 nm IR may be used to transmit data in the other direction. The caveats noted above also apply here.

Figure 9:
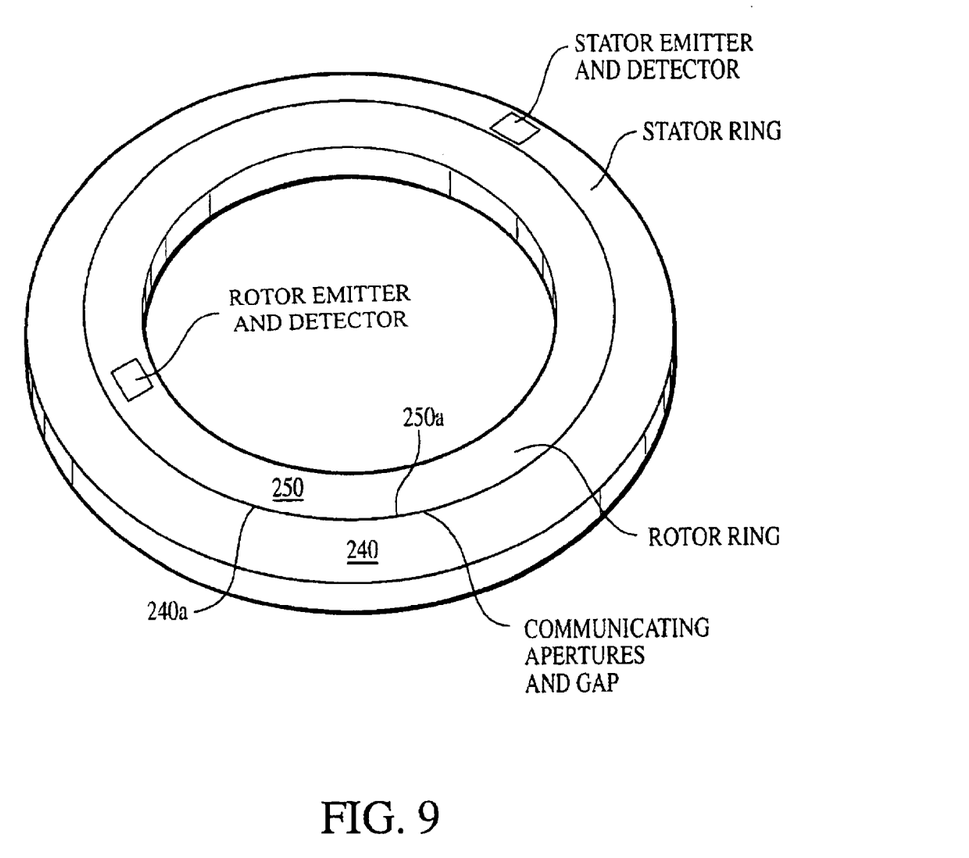
FIG. 9 is a perspective view of the polyphase transformer of FIG. 8.
Figure 10:
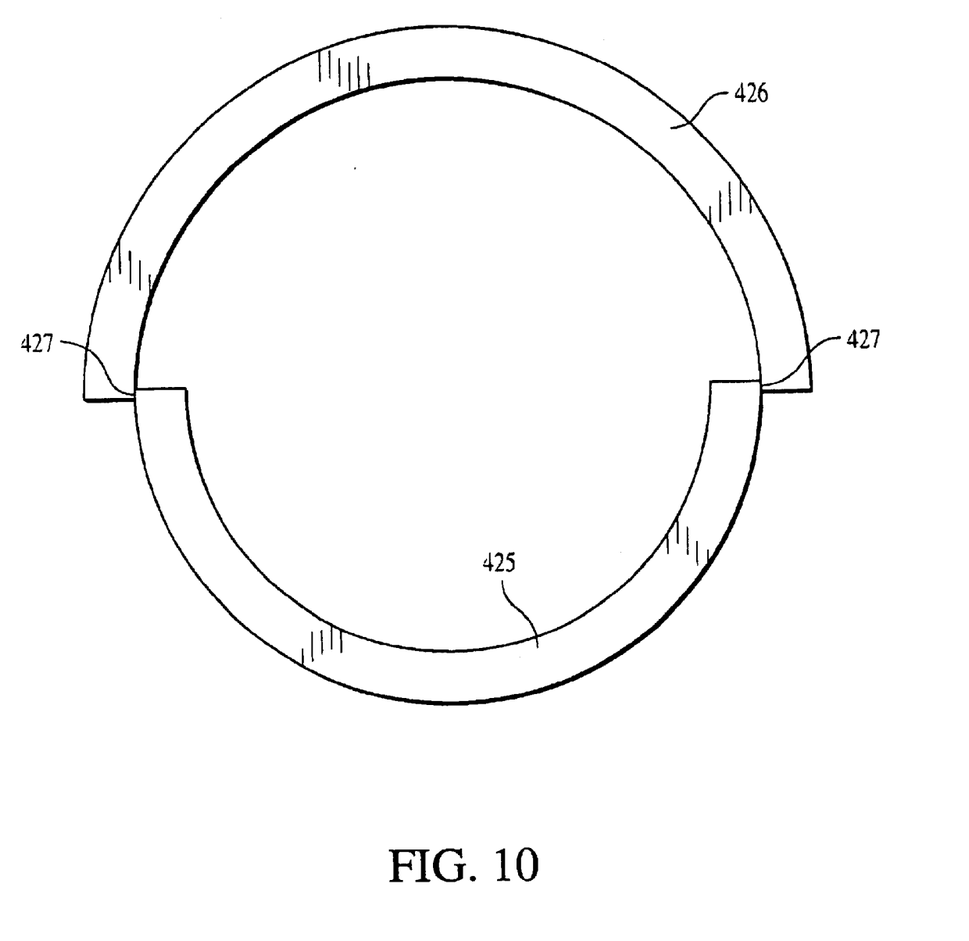
FIG. 10 is a view of an alternative embodiment of the polyphase transformer.

The optical path for transformer 300 includes stationary portion 240 and rotatable portion 250. Stationary portion 240 and rotatable portion 250, in this embodiment, are two concentric rings of polycarbonate (see FIG. 9). Stationary portion 240 is the outer ring and rotatable portion 250 is the inner ring, in this embodiment; although the invention is not limited as such. It is noted, however, that portions of the rings may be used, which are at least 180° in diameter and overlap. For example, as shown in FIG. 10, rotatable portion 425 and stationary portion 426 may comprise semi-curricular rings that are greater than 180°, so long as there is at least one common overlapping area 427 between the two portions in which to establish and maintain an optical path between optical emitter/receiver pairs.

Referring back to FIG. 9, as above, the optical path is location-invariant with respect to each optical emitter/receiver pair. This is achieved by creating a light guide with a restricted aperture by coating all surfaces except the communication edges of the two concentric rings with reflective material. Rotatable portion (ring) 250 receives and emits light on its outer edge 250*a*, while stationary portion (ring) 240 receives and emits light on its inner edge 240*a*. The two rings are separated by a gap that is about 0.7 inches. Both the optical emitters and receivers are embedded and stycast into the polycarbonate rings such that the axes of the emitter and the detector are aligned with the center line of a light guide structure.

The optical communications system described with respect to transformers 200 and 300 may be used with system 400 (a three-phase system) or with any other exciter assembly system, such as the one-phase system of FIG. 1. In fact, the optical communication system described herein can be used to implement any kind of telemetry, and is not limited to use with exciter assembly systems.

The invention is not limited to the specific embodiments set forth above. Other embodiments not described are also within the scope of the following claims. For example, one or more features of the above-described embodiments may be combined in a single device/system to form an embodiment not explicitly described herein. The geometries of the transformers may vary from those described above. Likewise, the invention is not limited to the specific voltages, currents, and wavelengths mentioned.

What is claimed is:

1. An exciter assembly for supplying current to a superconducting load, the exciter assembly comprising:
    a transformer for generating the current, the transformer comprising:
        a stationary winding portion having a stationary winding; and
        a rotatable winding portion having a rotatable winding that outputs the current for the superconducting load; and
    emitter and receiver pairs, the emitter and receiver pairs defining paths over which information is exchanged bi-directionally between the stationary winding portion and the rotatable winding portion, the information comprising commands to regulate the superconducting load and telemetry data indicating a state of the superconducting load.

2. The exciter assembly of claim 1, wherein the stationary winding portion and the rotatable winding portion comprise concentric rings.

3. The exciter assembly of claim 1, wherein the stationary winding portion and the rotatable winding portion comprise at least portions of concentric rings that cover greater than 180° and that overlap at least in part.

4. The exciter assembly of claim 1, wherein at least part of the stationary winding portion and the rotatable winding portion are coated with reflective material.

5. The exciter assembly of claim 1, wherein the stationary winding portion and the rotatable winding portion comprise facing surfaces.

6. The exciter assembly of claim 1, further comprising:
    a controller; and
    circuitry for controlling the current supplied from the transformer to the superconducting load, the circuitry being coupled to the rotatable winding portion.

7. The exciter assembly of claim 6, wherein the circuitry exchanges information with the controller over the paths.

8. The exciter assembly of claim 7, wherein the controller includes an interface to an external device, over which the controller provides information to, and receives information from, the external device.

9. The exciter assembly of claim 8, wherein the external device comprises a device on a network.

10. The exciter assembly of claim 8, wherein at least some of the information transmitted between the controller and the external device and between the controller and the circuitry is the same information.

11. The exciter assembly of claim 6, wherein:

an optical emitter is on the stationary winding portion and an optical receiver is on the rotatable winding portion, the optical emitter and the optical receiver providing first information from the controller to the circuitry; and the exciter assembly further comprises a second optical emitter on the rotatable winding portion and a second optical receiver on the stationary winding portion, the second optical emitter and the second optical receiver providing second information from the circuitry to the controller.

12. The exciter assembly of claim 11, wherein the first information comprises at least one of a command to maintain a level of the current in the superconducting load and a command to release energy from the superconducting load.

13. The exciter assembly of claim 11, wherein the second information comprises diagnostic information that relates to one or more of the circuitry and the superconducting load.

14. The exciter assembly of claim 1, wherein the emitter and receiver pairs comprise optical emitters and optical receivers that emit and receive, respectively, one of infrared light and visible light.

15. The exciter assembly of claim 1, further comprising:

a power source which supplies initial current to the stationary winding, the transformer generating the current in the rotatable winding from the initial current.

16. The exciter assembly of claim 1, wherein the stationary winding portion comprises a non-magnetic material to support the stationary winding, and the rotatable winding portion comprises a non-magnetic material to support the rotatable winding.

17. An exciter assembly for supplying current to a superconducting load, the exciter assembly comprising:

a transformer for generating the current, the transformer comprising:

a stationary winding portion having a stationary winding; and a rotatable winding portion having a rotatable winding;

a first optical emitter mounted on the stationary winding portion;

a first optical receiver mounted on the rotatable winding portion, the first optical receiver receiving first information via light having a first wavelength from the first optical emitter, the first information comprising commands to regulate the superconducting load;

a second optical emitter mounted on the rotatable winding portion; and a second optical receiver mounted on the stationary winding portion, the second optical receiver receiving second information via light having a second wavelength from the second optical emitter, the second information comprising telemetry data indicating a state of the superconducting load.

18. The exciter assembly of claim 17, wherein the first and second wavelengths of light are different.

19. The exciter assembly of claim 17, wherein the first wavelength of light is an infrared wavelength and the second wavelength of light is a visible wavelength.

20. The exciter assembly of claim 17, wherein the first wavelength of light is a visible wavelength and the second wavelength of light is an infrared wavelength.

21. The exciter assembly of claim 17, wherein the first and second wavelengths of light are part of the same region of the electromagnetic spectrum.

22. The exciter assembly of claim 21, wherein the first and second wavelengths of light are both infrared wavelengths.

23. The exciter assembly of claim 21, wherein the first and second wavelengths of light are both visible wavelengths.

24. The exciter assembly of claim 17, wherein the light having first and second wavelengths is modulated by a carrier frequency, and wherein the carrier frequency is between 30 kHz and 1 MHz.

25. The exciter assembly of claim 17, wherein the stationary winding portion and the rotatable winding portion comprise at least portions of concentric rings that cover greater than 180° and that overlap at least in part.

26. The exciter assembly of claim 17, wherein the stationary winding portion and the rotatable winding portion comprise facing surfaces.

27. The exciter assembly of claim 17, wherein the stationary winding portion comprises a non-magnetic material to support the stationary winding, and the rotatable winding portion comprises a non-magnetic material to support the rotatable winding.

* * * * *